United States Patent [19]
Saito

[11] Patent Number: 5,883,442
[45] Date of Patent: Mar. 16, 1999

[54] METHOD AND APPARATUS FOR DETECTING AN IMPACT ON A VEHICLE

[75] Inventor: Yasushi Saito, Nagoya, Japan

[73] Assignee: Aisin Seiki Kabushiki Kaisha, Kariya, Japan

[21] Appl. No.: 919,325

[22] Filed: Aug. 28, 1997

[30] Foreign Application Priority Data

Aug. 29, 1996 [JP] Japan ................................. 8-228992

[51] Int. Cl.$^6$ .................................................. B60R 21/32
[52] U.S. Cl. .......................... 307/10.1; 180/282; 280/735; 701/46
[58] Field of Search ..................... 307/9.1, 10.1, 307/121; 701/45, 46, 47; 180/282, 271; 280/734, 735; 340/436, 438, 669

[56] References Cited

U.S. PATENT DOCUMENTS 5,185,701  2/1993  Blackburn et al. .................... 307/10.1
5,777,225  7/1998  Sada et al. ........................... 280/735

Primary Examiner—Richard T. Elms
Attorney, Agent, or Firm—Sughrue, Mion, Zinn, Macpeak & Seas, PLLC

[57] ABSTRACT

An apparatus for detecting an impact on a vehicle operates a restraint system by detecting an acceleration of the vehicle. A method for detecting an impact on the vehicle includes the steps of obtaining an acceleration value from an acceleration signal, detecting a signal peak of the acceleration value from the acceleration value, judging a peak time between a first peak time and a second peak time of the acceleration values, comparing the peak time with a predetermined time, adding weight to the acceleration value so as to reduce the acceleration value when the peak time is longer than the predetermined time, integrating after a weight added value and the acceleration value are multiplied for a predetermined time and operating a restraint system when an integrated value is larger than a predetermined value.

5 Claims, 7 Drawing Sheets

HEAD-ON COLLISION (LOW SPEED)

OFFSET COLLISION OR OBLIQUE COLLISION

HEAD-ON COLLISION (HIGH SPEED)

BAD ROAD

OBLIQUE COLLISION

BAD ROAD

OBLIQUE COLLISION

BAD ROAD

OBLIQUE COLLISION

METHOD AND APPARATUS FOR DETECTING AN IMPACT ON A VEHICLE

BACKGROUND OF THE INVENTION

1. Field of the Invention

The present invention relates to a method and apparatus for detecting an impact to actuate a vehicle passenger restraint system, and more particularly to a restraint system such as an air bag system, a seat belt pre-loader or the like.

2. Description of the Prior Art

In recent years, air bag systems have been installed in vehicles as a restraint system to supplement a seat belt. That is, the air bag system is provided for reducing the shock to a driver in the case of a frontal impact on the vehicle exceeding a predetermined level. According to a conventional air bag system, when an acceleration sensor detects a frontal impact greater than a predetermined threshold level, an air bag placed inside a steering wheel is momentarily inflated to reduce the shock to the driver. In such a restraint system, it is important to detect an impact on the vehicle accurately and rapidly. Therefore, an improvement of the acceleration sensor is required and an improvement in the method and apparatus for detecting an impact force according to the nature of the impact is also required.

As to the judging of the nature of an impact on the vehicle, a method for judging whether such an impact was made by a collision or a bad road condition is disclosed in Japanese Patent Laid-open Publication No. Hei 4 (1992)-358945. In this method, a first value is obtained by integrating an acceleration signal from an acceleration sensor for a certain period of a section, a second value is obtained by differentiating the acceleration signal and a third value is obtained by adding the first value to the second value. An impact judgment for a restraint system is made based on the third value.

However, the above-mentioned method uses a sectional integration, whereby the method needs a certain amount of time (e.g., 30–60 ms) for judging an impact accurately. Since this method takes a long time to judge whether the impact was made due to a bad road condition, it is difficult to immediately judge an impact in a vehicle where the demand time of an impact judgment is short. If a sectional integrated time was made shorter, the threshold level of judging a bad road condition would be increased and the impact judgment would be too late. In this method, it is difficult to achieve an acceptable basic performance.

SUMMARY OF THE INVENTION

Accordingly, it is an object of the present invention to provide a method and apparatus for accurately detecting an impact on a vehicle irrespective of the conditions of the impact.

It is a further object of the present invention to provide a method and apparatus for use with a vehicle passenger restraint system so as to effectively protect the passenger irrespective of the conditions of the impact.

It is a still further object of the present invention to provide an apparatus for accurately detecting an impact on a vehicle and distinguishing a bad road condition impact from a collision impact on the vehicle for use with a vehicle passenger restraint system.

In order to achieve the above mentioned objects, the present invention provides a method for detecting an impact on a vehicle comprising the steps of detecting the acceleration of the vehicle, operating an acceleration value from an acceleration signal, detecting a signal peak of the acceleration from the acceleration value, judging a peak-to-peak time between a first peak time and a second time of the acceleration peak, comparing the peak-to-peak time with a predetermined time, adding the acceleration value to weight when the peak-to-peak time is longer than the predetermined time, integrating after a weight added value and the acceleration value are multiplied for a predetermined time and operating a restraint system when an integrated value is larger than a threshold level.

BRIEF DESCRIPTION OF THE DRAWINGS

The above-mentioned objects and following description will become readily apparent with reference to the accompanying drawings, wherein like reference numerals denote like elements, and in which.

DETAILED DESCRIPTION OF THE INVENTION

Figure 1:
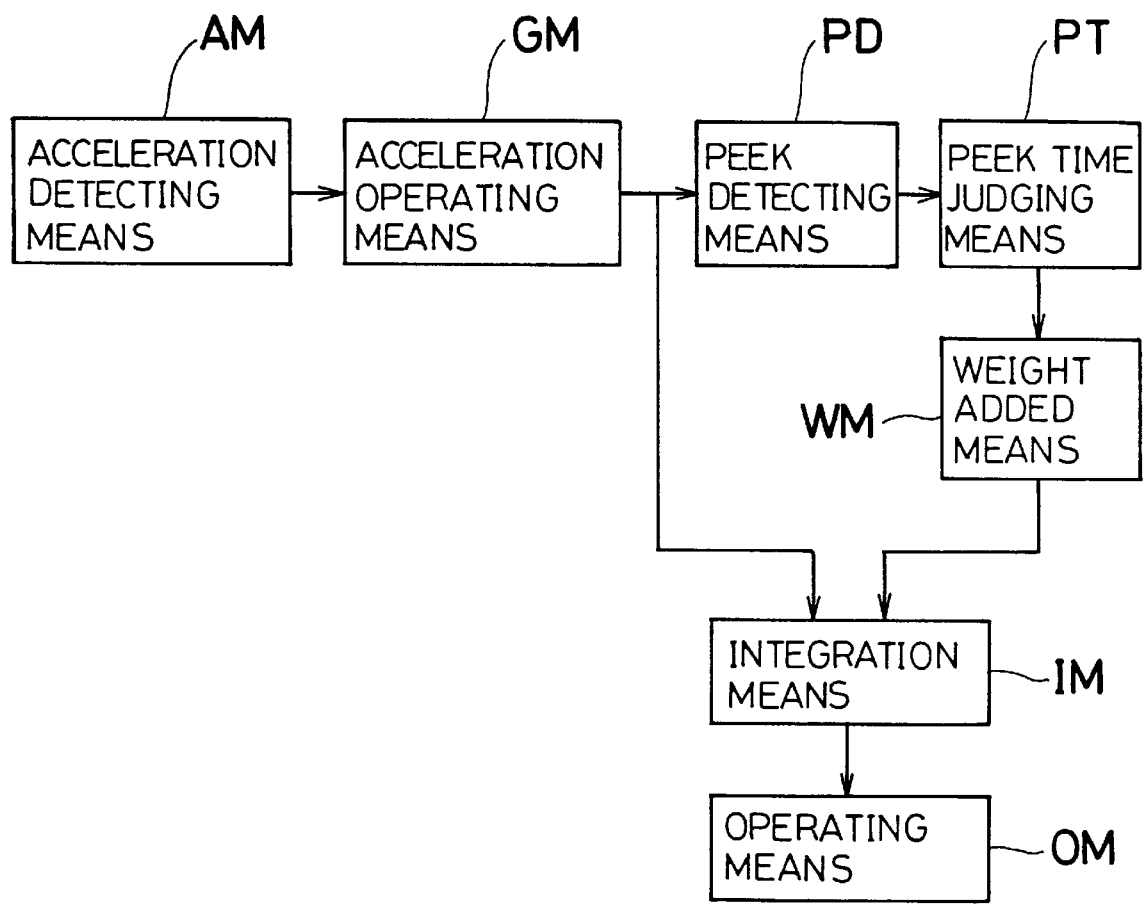
FIG. 1 is a schematic block diagram showing an impact detecting system according to the present invention.

Referring to FIG. 1, there is schematically illustrated an impact detection system for use in a vehicle according to the present invention. An acceleration sensor (AM) is provided for detecting an acceleration of the vehicle. An acceleration signal which is an output from the acceleration sensor is supplied to a microcomputer (GM). Then a peak of the acceleration signal is detected by the microcomputer (PD) and a peak-to-peak time which is the time between a first peak and a second peak is judged by the microcomputer (PT). If the peak-to-peak time is longer than a predetermined time, a weight is added to an acceleration value from the acceleration operation so as to reduce the acceleration value (WM). The acceleration value from the acceleration operation and a weighted acceleration value are multiplied. The multiplied value is integrated (IM) in a short time and the integrated value is compared with a threshold level of an impact judgment. A restraint system in such an air bag system is operated (OM) if the integrated value is greater than the threshold level.

Figure 2:
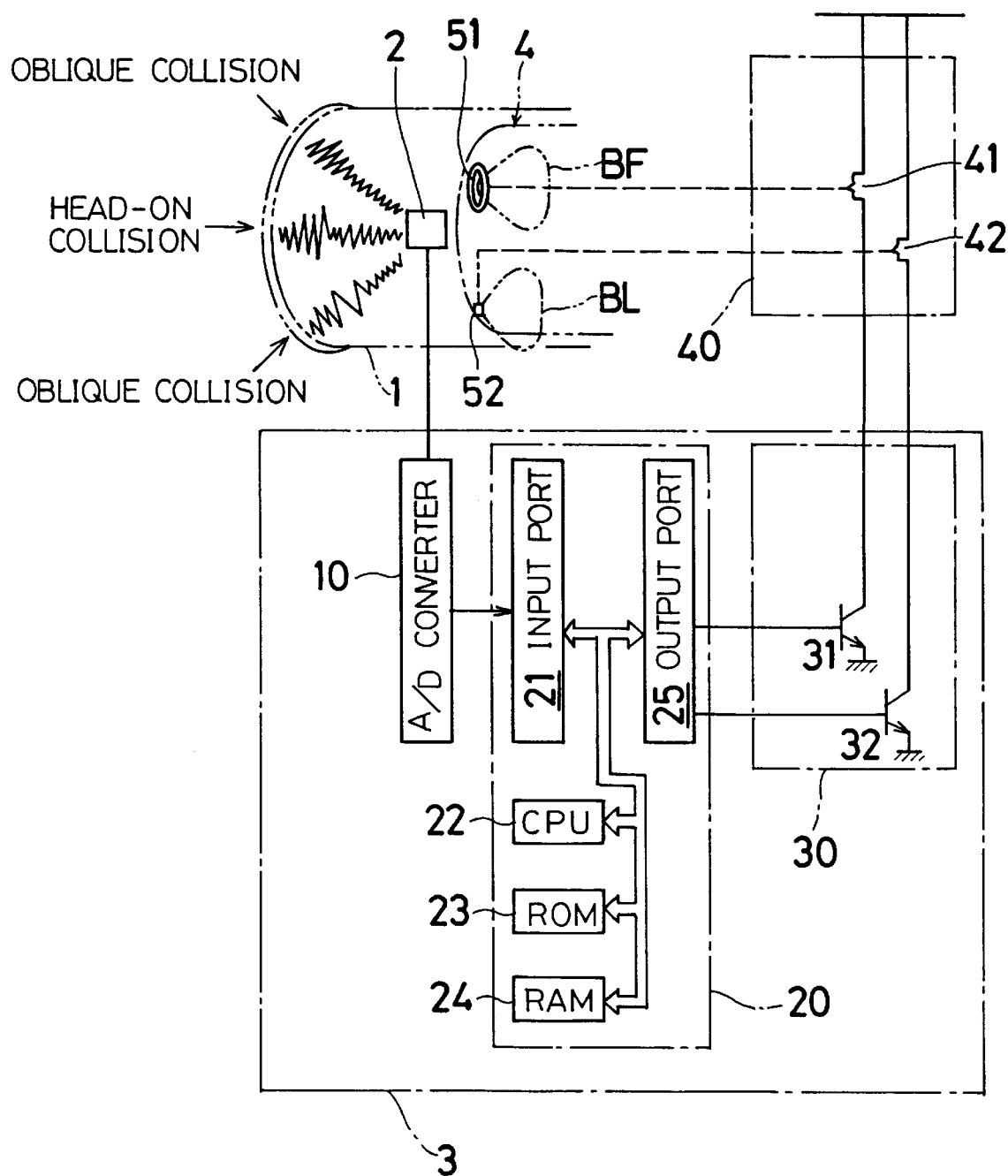
FIG. 2 is a schematic block diagram showing a construction of an air bag system according to an embodiment of the present invention.

Referring to FIG. 2, there is disclosed a vehicle passenger restraint system provided with the impact detection system, which is an air bag system, in which an acceleration sensor 2 is disposed in a predetermined location, e.g., a central portion of a vehicle 1 and electrically connected to an air bag device 4. The air bag device 4 includes a plurality of air bags BF, BL as shown in FIG. 2 in their inflated conditions by two-dotted chain lines and a plurality of inflaters 51, 52 for inflating them.

The acceleration sensor 2 is arranged to output a signal responsive to an acceleration (including a deceleration as a negative value) of the vehicle 1. Any type of sensor may be employed for the acceleration sensor 2 such as that of a mechanical type using a mass-rotor, one having a strain gauge made of a semi-conductor, or the like, provided that output electric signals are produced indicative of the accelerations as shown in FIGS. 4–8 where a deceleration of the vehicle 1 reaches a value corresponding to an impact force greater than a predetermined level when a vehicle collision has occurred.

Figure 4:
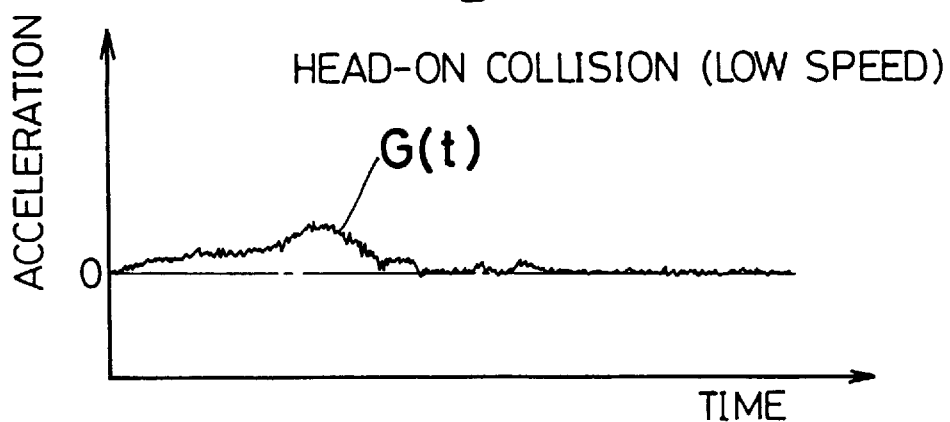
FIG. 4 shows an example of a characteristic of a signal detected by an acceleration sensor in the case where a head-on collision occurred when the vehicle was running at a relatively low speed according to an embodiment of the present invention.
Figure 5:
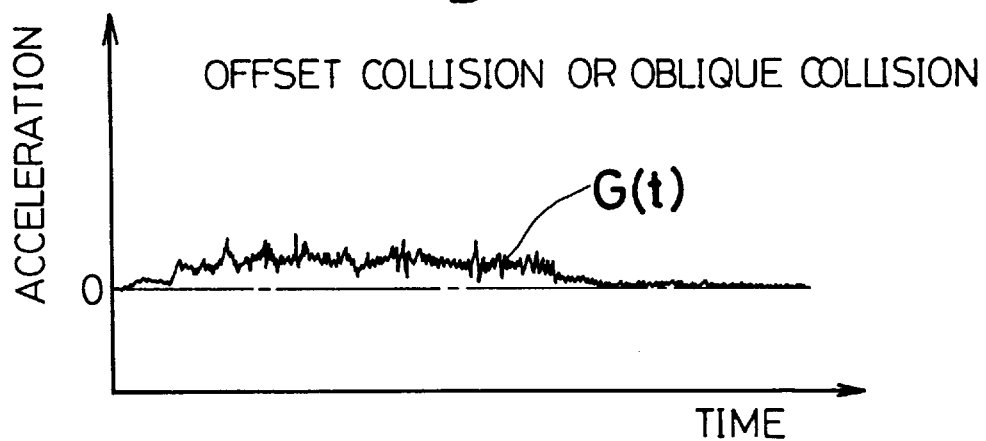
FIG. 5 shows an example of a characteristic of a signal detected by an acceleration sensor when an offset collision or an oblique collision occurred according to an embodiment of the present invention.
Figure 6:
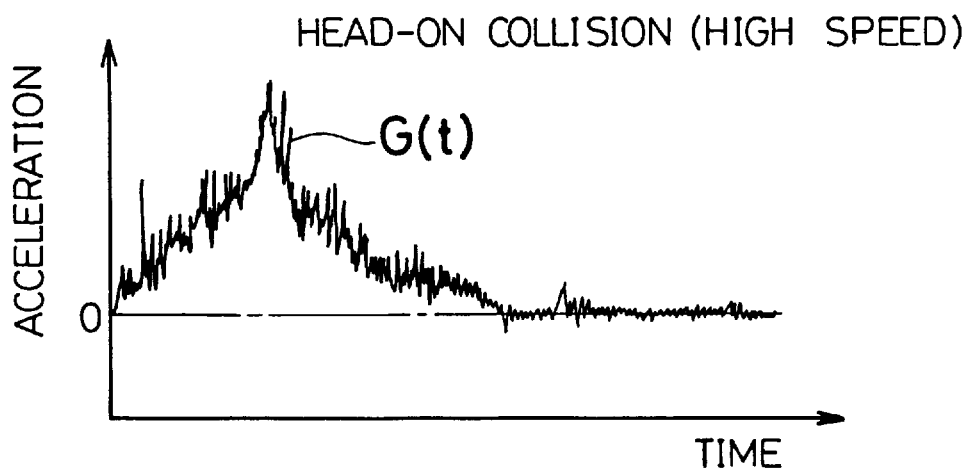
FIG. 6 shows an example of a characteristic of a signal detected by an acceleration sensor in the case where a head-on collision occurred when the vehicle was running at a relatively high speed according to an embodiment of the present invention.
Figure 7:
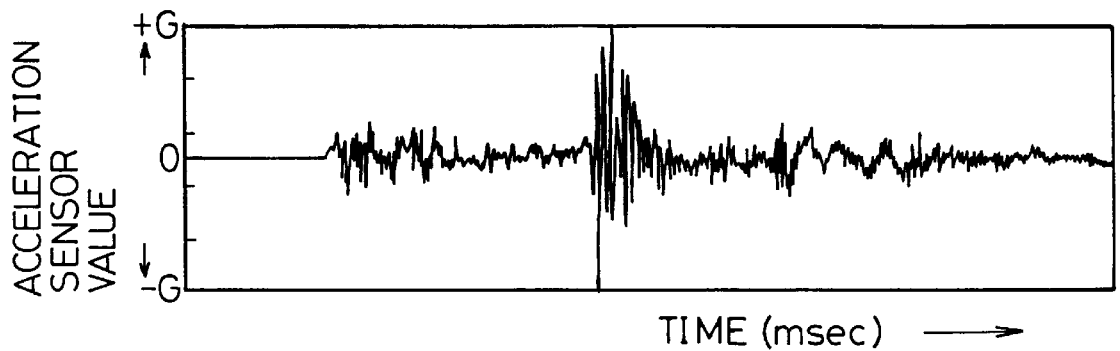
FIG. 7 shows an example of a characteristic of a signal detected by an acceleration sensor when the vehicle was running on a bad road according to an embodiment of the present invention.
Figure 8:
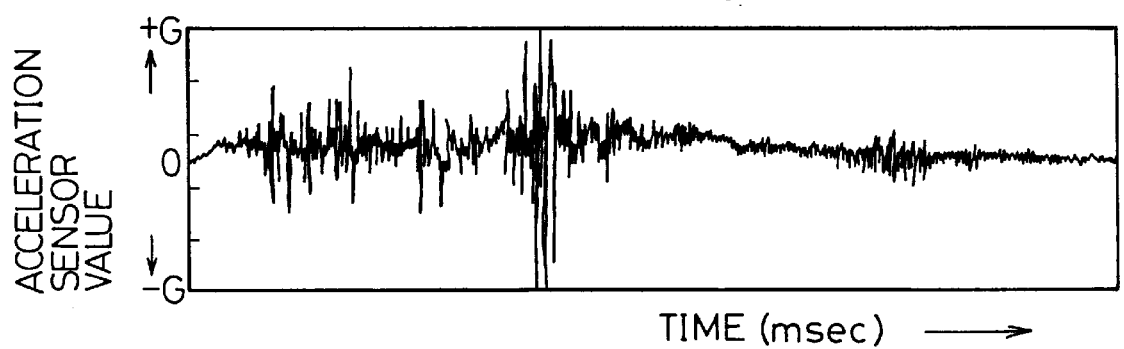
FIG. 8 shows an example of a characteristic of a signal detected by an acceleration sensor when an oblique collision occurred according to an embodiment of the present invention.

FIGS. 4–8 illustrate an output characteristic of the acceleration sensor 2 which outputs a continuous analog signal. FIG. 4 shows its characteristic in the case where a head-on collision has occurred when the vehicle 1 was running at a relatively low speed, so that the air bag device 4 will be inoperative. FIG. 5 shows its characteristic when an offset collision or an oblique collision has occurred. In this case, at least either one of the air bags BF, BL has to be inflated. FIG. 6 shows its characteristic in the case where the head-on collision has occurred when the vehicle 1 was running at high speed. In this case, at least a front air bag BF must be inflated and the air bags BF, BL may be inflated depending upon the magnitude of the collision. FIG. 7 shows a signal detected by an acceleration sensor 2 when the vehicle 1 is running on a bad road. In this case, the air bags BF, BL must not be inflated even though such signal is similar to a wave caused by an oblique collision. FIG. 8 shows a signal detected by an acceleration sensor 2 when an oblique collision has occurred. In this case, the air bags BF, BL must be inflated depending upon the magnitude of the collision.

The acceleration sensor 2 is connected to an electronic control unit 3 in such a manner that the output of the acceleration sensor 2 is input to a microcomputer 20 through an A/D converter 10. An ignition control circuit 30 is connected to the microcomputer 20 to be driven thereby, so that an ignition device 40 is driven by the ignition control circuit 30. The ignition device 40 includes squibs 41, 42 which ignite the inflaters 51, 52. The microcomputer 20 is constituted in such a conventional manner that input port 21, a central processing unit (CPU) 22, a read only memory (ROM) 23, a random access memory (RAM) 24, an output port 25 etc. are connected to each other through a common base. An output signal from the A/D converter 10 is transmitted to the input port 21 and computed at the CPU 22. Then an output signal from the output port 25 is transmitted to the ignition control circuit 30.

Figure 3:
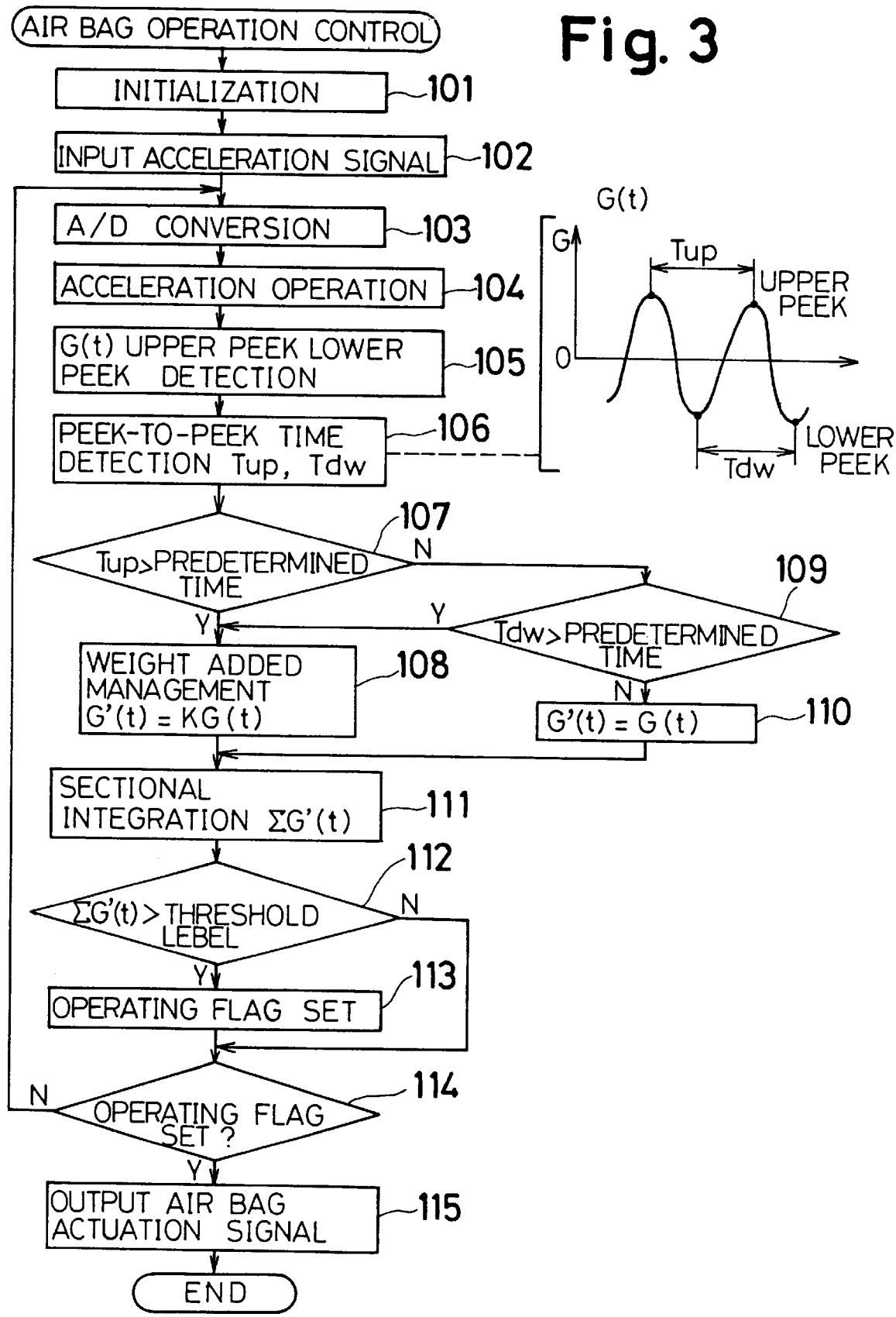
FIG. 3 is a flow chart showing operation of an air bag system according to an embodiment of the present invention.

In the microcomputer 20, the ROM 23 memorizes a program corresponding to flow charts as shown in FIG. 3. The CPU 22 executes the program while an ignition switch (not shown) is closed (turned on) and the RAM 24 temporarily memorizes variable data needed to execute the program.

The ignition control circuit 30 includes switching transistors 31, 32, for example, which are turned on or off in response to output signals from the microcomputer 20 so as to heat up the squibs 41, 42 in the ignition device 40. The inflaters 51, 52 are provided therein with the squibs 41, 42 respectively. In each of the inflaters 51, 52, when the respective one of the squibs 41, 42 is heated, an ignition agent (not shown) contained in the squibs 41, 42 is ignited so that fire spreads instantaneously to the gas generator (not shown), which generates a large amount of gas (e.g., nitrogen gas). The inflaters 51, 52 are provided for supplying the gas to a right air bag BF which is installed in a steering wheel pad and to a left air bag BL which is installed under the left side of an instrument panel, respectively. The structure and function of each of the inflaters (air bags, etc.) are substantially the same as those employed in air bag systems already on the market, so that a detailed explanation of those is omitted.

The present invention will be explained hereinafter by a program routine on the basis of a flow chart as shown in FIG. 3. The program routine executed by the electronic control unit 3 for detecting the impact and controlling the air bag system will now be described with reference to FIG. 3. The program routine starts at a fixed cycle (e.g., 0.25 ms) when the ignition switch (not shown) is turned on.

First of all, the program starts when the electronic control unit 3 is provided with a power supply, the program executes for initialization of the system at Step 101 to clear various data and set a plurality of fixed values in RAM 24 and the program proceeds to Step 102 where the acceleration sensor 2 detects deceleration of the vehicle to generate an acceleration signal in proportion to the magnitude of the deceleration as shown in FIGS. 4–8. The program then proceeds to Step 103, where the output signal from the acceleration sensor 2 is converted into a digital signal by the A/D converter 10. The converted signal is input into the microcomputer 20. For example, when the vehicle collides, a large deceleration signal from the acceleration sensor 2 occurs since the vehicle reduces its speed suddenly. The amount of the acceleration signal from the acceleration sensor 2 is used for an impact judgment.

The program then executes an acceleration operation at Step 104. An acceleration value, after the A/D conversion, is passed through a low pass filter (LPF). This low pass filter is explained hereinafter.

This filter formula is well known, that is, if an input is X, an output is Y, A and B are two coefficients, this time is (n), last time is (n−1), a formula of a filter management (LPF) is as follows: $Y(n)=A(X(n)+X(n-1))+BY(n-1)$ An acceleration value G(t) equals an acceleration value after the filter which is obtained as mentioned above. At Step 105, an upper peak of G(t) (maximum value of G(t)) and a lower peak of G(t) (minimum value of G(t)) are detected by the CPU 22 in the microcomputer 20. A plurality of lower peaks of G(t) and a plurality of maximum peaks of G(t) are detected. At Step 106, a peak-to-peak time (Tup) between one upper peak and the next upper peak and a peak-to-peak time (Tdw) between one lower peak and the next lower peak are detected. The upper peak-to-peak time Tup is compared with a predetermined time (e.g., 1 ms) at Step 107. If it is determined that the time Tup exceeds a predetermined time, the program proceeds to Step 108, otherwise it proceeds to Step 109. At Step 109, in the same fashion, if it is determined that the peak-to-peak time Tdw exceeds a predetermined time (e.g., 1 ms), the program proceeds to Step 108. Otherwise, it proceeds to Step 110. At Step 110, a weight is not added to the acceleration value G(t) so the weighted value G'(t) is provided the same as the acceleration value G(t). The program proceeds to Step 111. At Step 108, G'(t) equals KG(t) in a weighted process, wherein a coefficient K makes the acceleration value lower.

Here, when each of the times Tup and Tdw are longer than a predetermined time (e.g., 1 ms), the coefficient K becomes zero, that is, the acceleration values in a range of this peak-to-peak time are treated as zero. But the coefficient K is not limited to zero. A value which makes the acceleration value smaller may be used.

Figure 9:
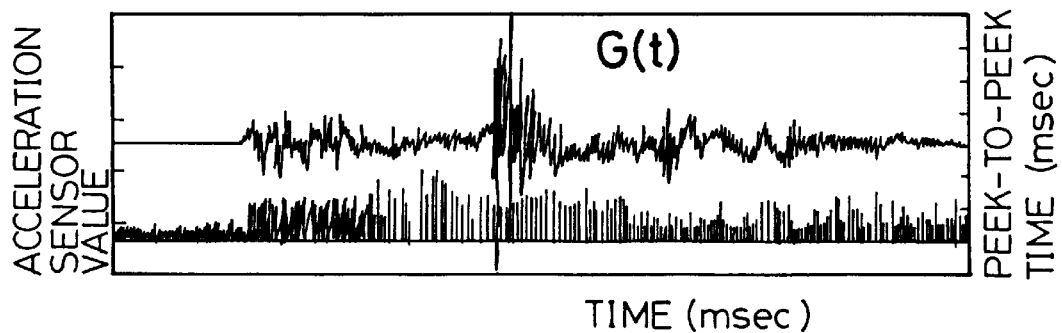
FIG. 9 shows a peak-to-peak time of an acceleration signal corresponding to FIG. 7.
Figure 10:
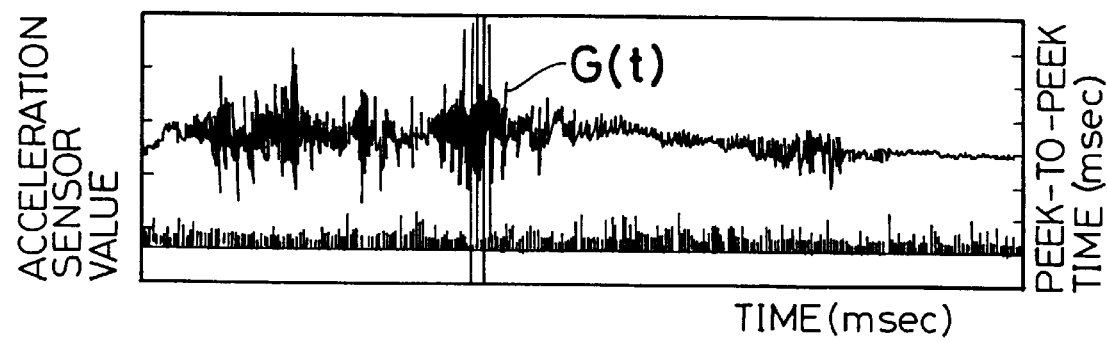
FIG. 10 shows a peak-to-peak time of an acceleration signal corresponding to FIG. 8.

Referring to FIG. 9 and FIG. 10, a weight is added to the acceleration value G(t) in accordance with an interval of the peak-to-peak time. Because an interval of the peak-to-peak time of an acceleration signal wave when the vehicle is running on a bad road becomes a sparse condition, and an interval of the peak-to-peak time of an acceleration wave when the vehicle receives an oblique collision becomes a dense condition, it is possible to separate the wave of the oblique collision from the wave of the bad road by adding a weight to the acceleration value G(t).

At Step 111, the program executes a sectional integration for the acceleration value G'(t) after the weight added process. An operation of this sectional integration ΣG'(t) adds up the acceleration value G(t) in a time period of a predetermined time (e.g., 15 ms). At Step 112, a sectional integrated value (equal to a value of ΣG'(t) is compared with a threshold level. If the integrated value is not larger than the threshold level, the program proceeds to Step 114, otherwise it proceeds to Step 113. The threshold level is determined based on the maximum value of the sectional integrated value for the acceleration value when the vehicle is running on a bad road. At Step 113, an operating flag to operate the air bag system is set.

At Step 114, it is determined whether the operating flag is set or not. The program is returned to Step 103 when the operating flag is not set and the program executes from Step 103. At Step 115, the air bag is operated in accordance with an output signal of the air bag system which is output from CPU 22 when the operating flag is set. The transistor 31 is turned on to heat up the squib 41. Consequently, the igniting agent (not shown) in the inflater 41 is ignited to spread the fire to the gas generator (not shown), which generates a large amount of nitrogen gas. The bag BF is inflated by the nitrogen gas instantaneously and spread in front of a vehicle driver.

On the other hand, when the peak-to-peak time is shorter than a predetermined time, it is possible to add a weight which makes the acceleration value larger. A predetermined value which is compared with the sectional integrated value can be determined by multiplying a safety margin with the sectional integrated value.

Figure 11:
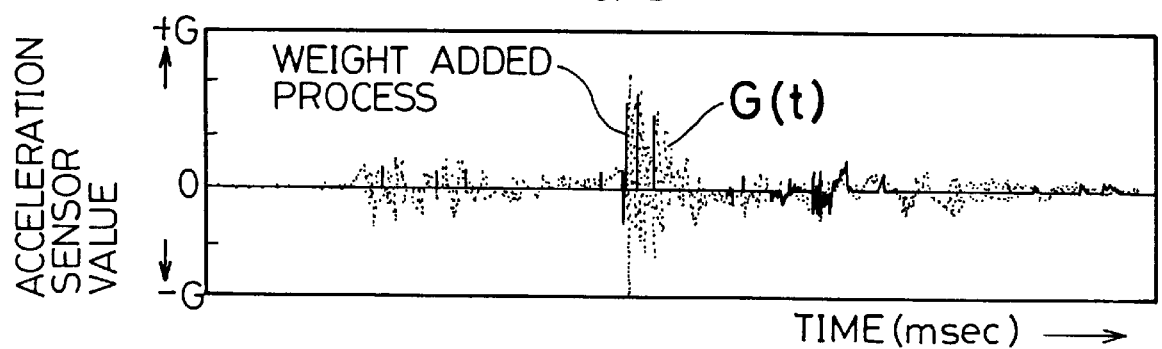
FIG. 11 shows an acceleration signal and shows a wave in which a weight is added to an acceleration value so as to correspond to the acceleration value when the vehicle was running on a bad road condition according to an embodiment of the present invention.
Figure 12:
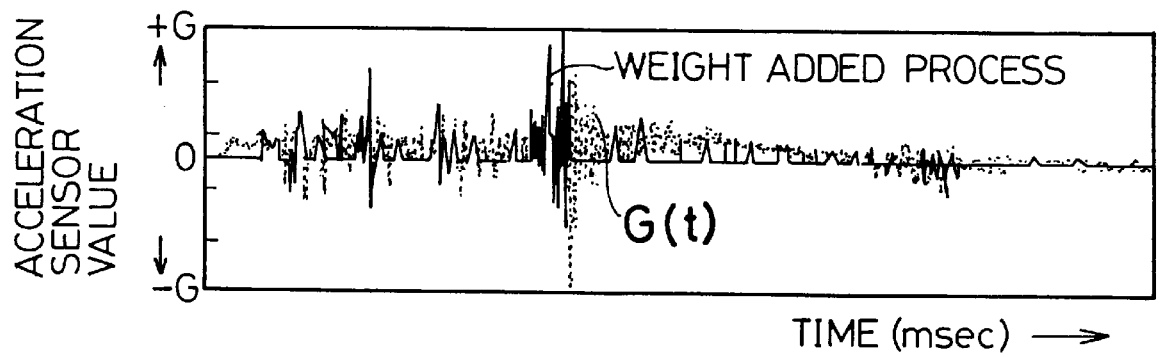
FIG. 12 shows an acceleration signal and shows a wave in which a weight is added to an acceleration value so as to correspond to the acceleration value when an oblique collision occurred according to an embodiment of the present invention.
Figure 13:
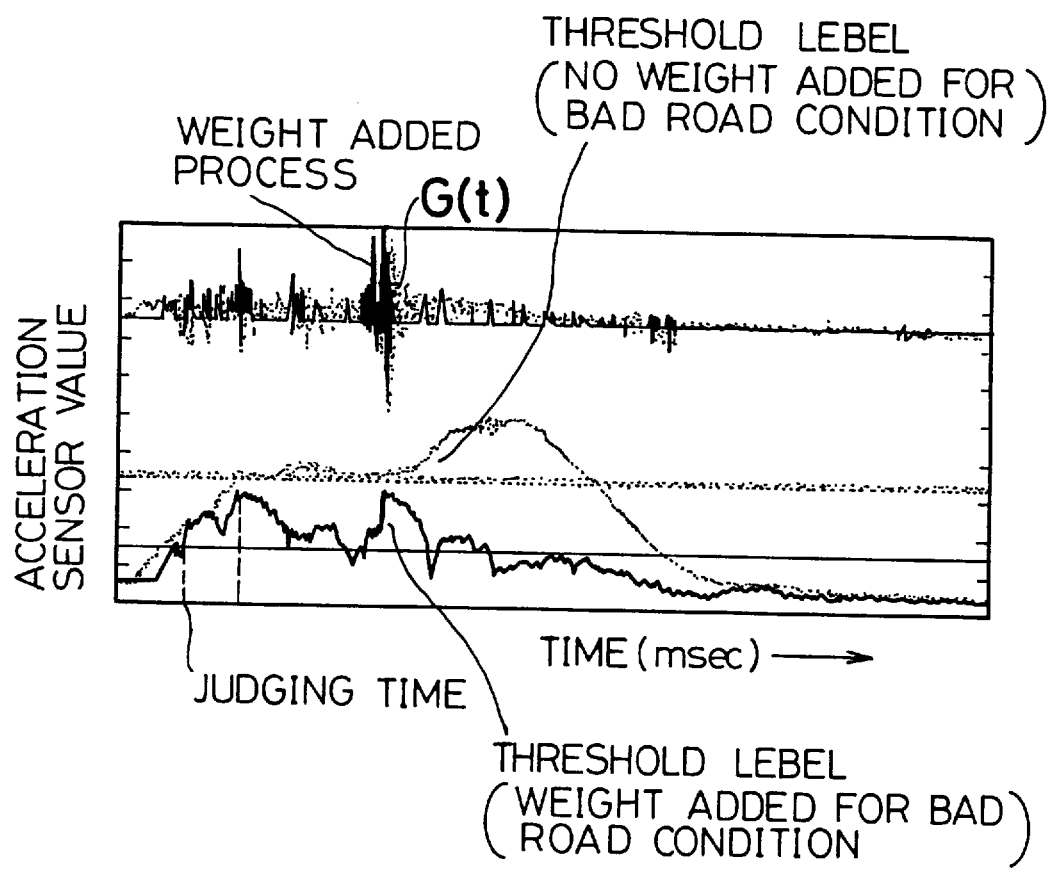
FIG. 13 shows a compared figure of a restraint system which shows an operating timing which compares the present invention with prior art.

If the acceleration value with the weight added is integrated in a sectional integration, as shown in FIGS. 11, 12, the vibration element is removed from the acceleration signal of the bad road or the oblique collision.

The present system is able to separate the bad road wave of the acceleration signal from the oblique collision wave thereof and the air bag system accurately operates when the vehicle has an oblique collision.

If the weight is added to the acceleration value, a sectional integrated value becomes small. Since it is possible to reduce the threshold level of the impact judgment, the impact judging time becomes shorter than in prior apparatuses.

This restraint system is not limited to an air bag system and may be used for a seat belt pre-loader system in order to restrain the driver or the like. It is also used for impact judgment with a wavelet transformer.

It should be apparent to one skilled in the art that the above described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A method for detecting an impact on a vehicle, comprising the steps of:

detecting an acceleration of the vehicle;

obtaining an acceleration value from an acceleration signal;

detecting a signal peak of the acceleration from the acceleration value;

judging a peak-to-peak time between a first peak time and a second peak time of the acceleration;

comparing the peak-to-peak time with a predetermined time;

adding weight to the acceleration value when the peak-to-peak time is longer than the predetermined time;

integrating after a weight added value and the acceleration value are multiplied for a predetermined time to obtain an integrated value; and operating a restraint system when the integrated value is larger than a threshold level.

2. A method for detecting an impact on a vehicle according to claim 1, wherein the threshold level is determined based on the maximum value of a sectional integrated value of the acceleration value when the vehicle is running on a bad road condition.

3. A method for detecting an impact on a vehicle according to claim 1, wherein the weight is zero.

4. A method for detecting an impact on a vehicle according to claim 1, wherein the weight is a coefficient so as to reduce the acceleration value.

5. An apparatus for detecting an impact on a vehicle comprising:

means for detecting an acceleration of the vehicle;

means for obtaining an acceleration value in accordance with an acceleration signal from the means for detecting an acceleration;

means for detecting peaks of the acceleration value from the means for obtaining the acceleration value;

means for judging a peak-to-peak time between a first peak and a second peak of the acceleration peaks;

means for comparing the peak-to-peak time with a predetermined time;

means for adding a weight to the acceleration value when the peak-to-peak time is longer than the predetermined time;

means for multiplying a weight added acceleration value and the acceleration value;

means for integrating a multiplied value for a predetermined time; and means for outputting a signal when the integrated value is greater than a threshold level.

* * * * *